UNITED STATES PATENT OFFICE.

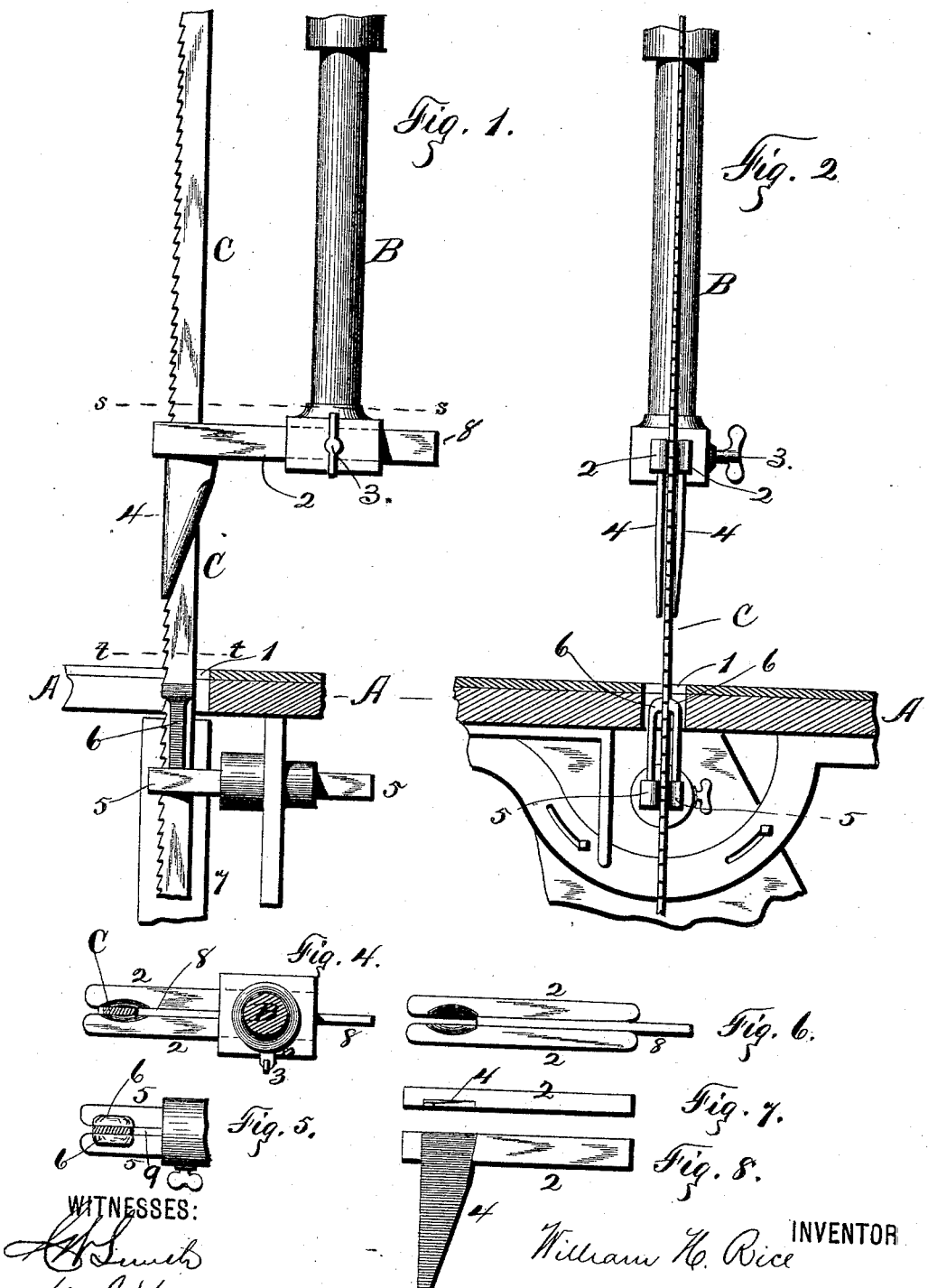

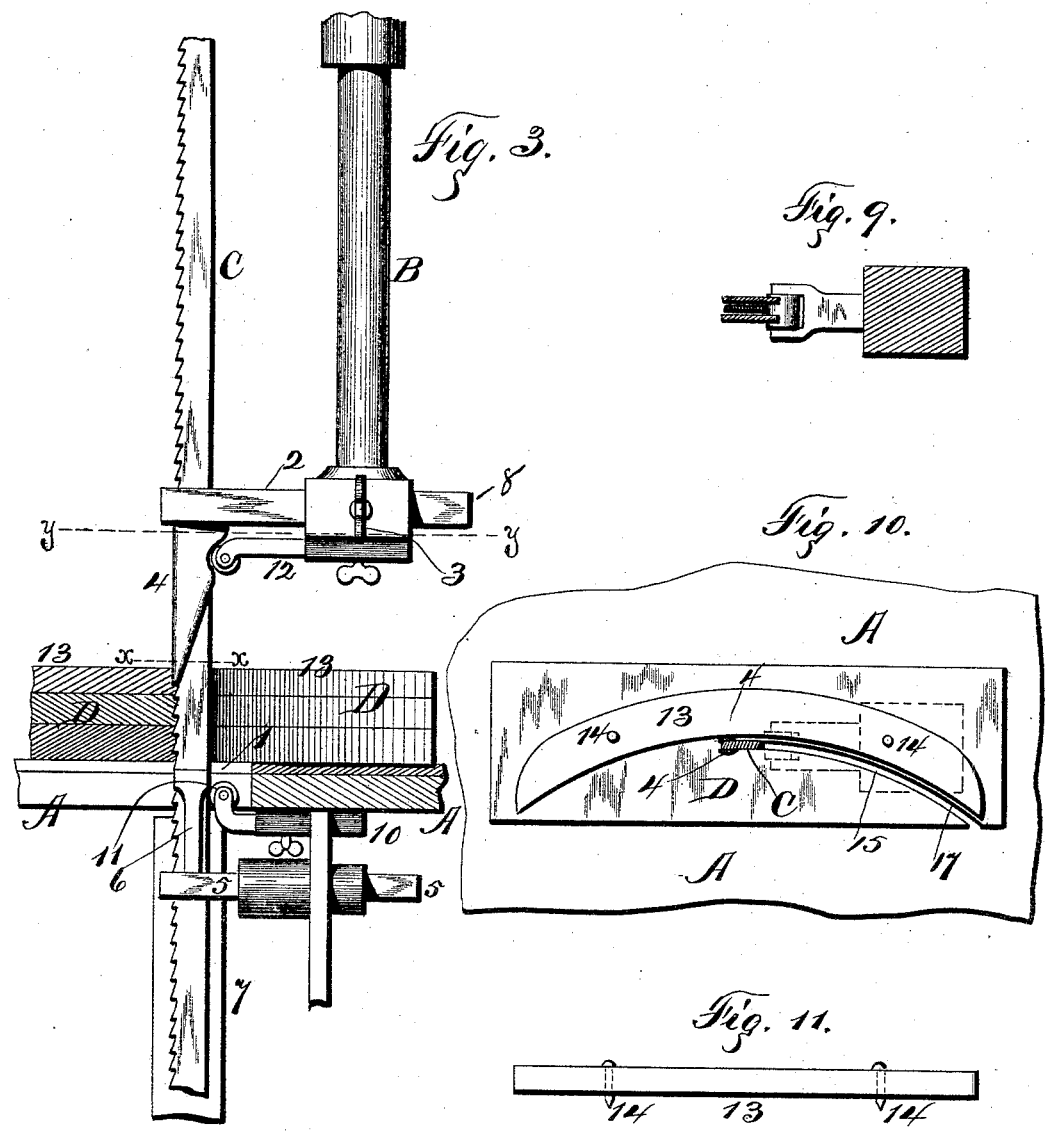

WILLIAM H. RICE, OF SYRACUSE, NEW YORK.

SAW-GUIDE.

SPECIFICATION forming part of Letters Patent No. 444,851, dated January 20, 1891.

Application filed April 8, 1890. Serial No. 347,101. (No model.)

*To all whom it may concern:*

Be it known that I, WILLIAM H. RICE, of Syracuse, in the county of Onondaga, in the State of New York, have invented new and useful Improvements in Saw-Guides, of which the following, taken in connection with the accompanying drawings, is a full, clear, and exact description.

My invention relates to band-saws, and especially to the guiding and steadying mechanisms in their construction.

My object is to improve the construction and increase the utility, the durability, and reduce the liability of the breaking of the saw to the minimum; and to that end my invention consists in the several novel features of construction and operation hereinafter described, and which are specifically set forth in the claims hereto annexed.

It is constructed as follows, reference being had to the accompanying drawings, in which—

Figure 1 is a side elevation of the parts of the machine to which my invention appertains. Fig. 2 is a front elevation of the same. Fig. 3 is a side elevation of the same, showing a piece of work on the table and partly sawed. Fig. 4 is a horizontal section on line s s in Fig. 1, showing a top plan of the bars carrying the upper guides. Fig. 5 is a like view on line t, showing a top plan of the lower saw-guides and bars carrying them. Fig. 6 is a top plan of the upper guide-bars detached. Fig. 7 is a bottom plan of one of these bars. Fig. 8 is an elevation of the inner face of one of the upper guide-bars and its guide-finger. Fig. 9 is a horizontal section on line x x in Fig. 3. Fig. 10 is a horizontal sectional plan of the work-table, work thereon partly sawed, and the saw and the upper guides. Fig. 11 is an edge elevation of a pattern with the tacks for holding it upon the work.

A is a portion of the work-table provided with a saw-slot 1.

B is the ordinary vertically-adjustable bar, which carries the saw guide-bars 2, which are horizontally adjustable and are secured by the set-screws 3. Each of these is provided with a downwardly-projecting and tapering finger 4, one standing on either side of the saw C.

The lower guide-bars 5 are suspended beneath the work-table, and each of them is provided with the auxiliary guides 6, the tops of which are curved inwardly and bear upon either side of the saw at a point within the saw-slot in the table and nearly up to a level with the top of the table, the saw below the table passing around the pulley 7, the like pulley above the table not being shown. I also insert between the upper guide-bars a flat bar 8, the outer end of which bears against the rear edge of the saw, and a like bar 9, also bearing against the rear edge of the saw, is placed between the lower guide-bars. Also, as shown in Fig. 3, I adjustably mount beneath the table a bar 10, provided with an upturned end, which is slotted and perforated to carry the roller 11 and its arbor, the roller standing up into the saw-slot, and at 12 I show a like bar and roller above the table. Both rollers bear against the rear edge of the saw and hold it against springing backward. When the rollers are used, the bars 8 9 may be dispensed with.

D represents a piece of work having a pattern 13 held in place thereon by the tacks or nails 14, and 15 is the saw-kerf in Fig. 10.

It will be observed that the fingers 4 are adjustable vertically and horizontally to accommodate work of different thickness and for saws of varying width; that the fingers extend down the maximum distance, so that one of them will bear against the edge of the pattern and guide the saw parallel with its edge a distance away therefrom equal to the thickness of the fingers, leaving a margin 17 on the work around the pattern, which is sufficient to permit the work to be finished down on its edges to the exact size of the pattern, and that in this manner the work is guided by simply keeping the finger in contact with the edge of the pattern, thus avoiding all straining of the eyes to follow a line and all blowing away of sawdust. The fingers 4 also operate to steady the upper part of the saw laterally, while the jaws on the guides 6 steady it laterally contiguous to the top of the work-table, thus reducing the danger of breaking to the minimum.

What I claim as my invention, and desire to secure by Letters Patent, is—

1. The combination, with the saw and the table provided with a saw-slot, of upper guide-bars mounted adjustably above the table and bearing against the sides of the saw, and guide-fingers dependent from the guide-bars and also bearing against the sides of the saw, and lower guide-bars supported beneath the table and bearing against the sides of the saw, and elongated fingers carried by and projecting above the lower bars and having points on their upper ends engaging with the sides of the saw.

2. The combination, with the saw and the table provided with a saw-slot, of upper guide-bars mounted adjustably above the table and bearing against the sides of the saw, an adjustable back-rest between the bars, and guide-fingers dependent from the guide-bars and also bearing against the sides of the saw, and lower guide-bars supported beneath the table and bearing against the sides of the saw, an adjustable back-rest mounted between the lower guide-bars, and elongated fingers carried by and projecting above the lower bars and having points on their upper ends engaging with the sides of the saw.

In witness whereof I have hereunto set my hand this 13th day of March, 1890.

WM. H. RICE.

In presence of—
H. P. DENISON,
C. W. SMITH.